United States Patent
Dai et al.

(10) Patent No.: US 11,032,103 B2
(45) Date of Patent: Jun. 8, 2021

(54) ETHERNET LINK EXTENSION METHOD AND DEVICE

(71) Applicant: Credo Technology Group Limited, Grand Cayman (KY)

(72) Inventors: Yifei Dai, Shanghai (CN); Haoli Qian, Fremont, CA (US); Jeff Twombly, Los Altos Hills, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/084,277

(22) PCT Filed: Mar. 8, 2017

(86) PCT No.: PCT/CN2017/075961
§ 371 (c)(1),
(2) Date: Sep. 12, 2018

(87) PCT Pub. No.: WO2018/161273
PCT Pub. Date: Sep. 13, 2018

(65) Prior Publication Data
US 2019/0386851 A1 Dec. 19, 2019

(51) Int. Cl.
*H04L 12/46* (2006.01)
*H04B 3/46* (2015.01)
(Continued)

(52) U.S. Cl.
CPC .......... *H04L 12/4633* (2013.01); *H04B 3/46* (2013.01); *H04L 12/40136* (2013.01); *H04L 45/02* (2013.01); *H04L 49/3054* (2013.01)

(58) Field of Classification Search
CPC .......... H04L 12/4633; H04L 12/40136; H04L 45/02; H04L 49/3054; H04L 12/4625; H04L 12/46; H04B 3/46; H04W 88/02
See application file for complete search history.

(56) References Cited

U.S. PATENT DOCUMENTS 8,488,729 B1   7/2013   Mendel et al.
8,832,511 B2   9/2014   Chen et al.
(Continued)

FOREIGN PATENT DOCUMENTS

CN   1770660 A      5/2006
CN   105814816 A    7/2016
(Continued)

OTHER PUBLICATIONS

Chinese Office Action dated Jan. 15, 2020 for Application No. 201810796112.0.
(Continued)

*Primary Examiner* — Christopher P Grey
(74) *Attorney, Agent, or Firm* — Ramey & Schwaller, LLP; Daniel J. Krueger

(57) ABSTRACT

Ethernet link extension methods and devices provide, in one illustrative embodiment, an Ethernet link extender with physical medium attachment (PMA) circuits each having a transmitter and receiver that communicate with a respective node in a sequence of communication phases. The sequence includes at least an auto-negotiation phase and a subsequent training phase, the phases occurring simultaneously for both PMA circuits. In the auto-negotiation phase, the PMA circuits operate in a pass-through mode, rendering the extender transparent to the two nodes. In the training phase, the PMA circuits operate independently, sending training frames to their respective nodes based in part on received back-channel information and locally-determined training status information. The training phases may be prolonged if needed to provide a simultaneous transition to a frame-forwarding phase of the sequence.

18 Claims, 3 Drawing Sheets

(51) Int. Cl.
*H04L 12/40* (2006.01)
*H04L 12/751* (2013.01)
*H04L 12/935* (2013.01)

(56) References Cited

U.S. PATENT DOCUMENTS

| | | | |
|---|---|---|---|
| 9,385,859 B2 | 7/2016 | Kuan et al. | |
| 9,647,859 B2 * | 5/2017 | Ghiasi | H04L 25/4904 |
| 10,212,260 B2 | 2/2019 | Sun | |
| 2001/0021987 A1 | 9/2001 | Govindarajan et al. | |
| 2003/0174788 A1 * | 9/2003 | Li | H04L 25/03866 375/329 |
| 2009/0086753 A1 | 4/2009 | Lund et al. | |
| 2009/0319838 A1 | 12/2009 | Jones, Jr. | |
| 2010/0329325 A1 | 12/2010 | Mobin et al. | |
| 2013/0013749 A1 | 1/2013 | Kane, Jr. et al. | |
| 2013/0073749 A1 | 3/2013 | Tremblay et al. | |
| 2013/0343400 A1 | 12/2013 | Lusted et al. | |
| 2014/0086264 A1 | 3/2014 | Lusted et al. | |
| 2014/0146833 A1 * | 5/2014 | Lusted | H04L 12/413 370/437 |
| 2014/0241411 A1 * | 8/2014 | Ghiasi | H04L 25/4904 375/231 |
| 2015/0003505 A1 | 1/2015 | Lusted et al. | |
| 2016/0037486 A1 | 2/2016 | Wentzloff et al. | |
| 2016/0080101 A1 | 3/2016 | Naeini et al. | |
| 2016/0134394 A1 | 5/2016 | Tiruvur et al. | |
| 2016/0323164 A1 | 11/2016 | Cao | |
| 2016/0337114 A1 | 11/2016 | Baden et al. | |
| 2016/0337183 A1 | 11/2016 | Cornett et al. | |
| 2017/0245226 A1 * | 8/2017 | Chow | H04L 49/351 |
| 2017/0324657 A1 | 11/2017 | Zhong | |
| 2018/0041332 A1 | 2/2018 | Yang | |
| 2018/0227149 A1 * | 8/2018 | Johnson | H04L 25/03019 |
| 2019/0386851 A1 | 12/2019 | Dai et al. | |

FOREIGN PATENT DOCUMENTS

| | | |
|---|---|---|
| CN | 106411322 A | 2/2017 |
| CN | 108737024 A | 11/2018 |
| CN | 109075992 A | 12/2018 |
| CN | 109286416 A | 1/2019 |

OTHER PUBLICATIONS

Laskin, Ekaterina. On-Chip Self-Test Circuit Blocks for High-Speed Applications. 2006. University of Toronto, Masters Thesis.
PCT International Search Report and Written Opinion, dated Dec. 6, 2017, Appl. No. "Ethernet Link Extension Method and Device," filed Mar. 8, 2017, 12 pages.
Supplemental Notice of Allowability, dated Jan. 14, 2019, U.S. Appl. No. 15/654,446, " Serdes Architecture With a Hidden Backchannel Protocol," filed Jul. 19, 2017, 8 pages.
PCT International Search Report and Written Opinion, dated Sep. 28, 2018, Appl. No. PCT/US2018/013361, "Serdes Systems and Methods Having an Indirect Backchannel," filed Jan. 11, 2018, 18 pages.
International Preliminary Report on Patentability dated Sep. 10, 2019 for PCT/CN2017/075961.
Notice of Allowability dated Jun. 8, 2018 for U.S. Appl. No. 15/487,045.
Non-Final Office Action dated Jan. 24, 2018 in U.S. Appl. No. 15/487,045.
Physical Coding Sublayer (PCS) for 64B/66B, Type 50GBASE-R, Feb. 3, 2017.
Physical Medium Attachment (PMA) Sublayer.
Physical Medium Dependent (PMD) Sublayer and Baseband Medium, Type 50GBASE-CR, 100GBASE-CR2, and 200GBASE-CR4, Feb. 3, 2017.
Reed-Solomon Forward Error Correction (RS-FEC) Sublayer for 50GBASE-R PHYs.
Information Technology—Open Systems Interconnection—Basic Reference Model: The Basic Model, 1994.
Reed-Solomon Forward Error Correction (RS-FEC) Sublayer for 100GBASE-R PHYs.
Notice of Allowance dated Sep. 19, 2018 in U.S. Appl. No. 15/654,446.
Chinese Notice of First Office Action dated Aug. 27, 2020 for CN Application No. 201810333105.7.
Chinese Notice of Grant dated Jun. 30, 2020 for Chinese Application No. 201810796112.0.
Notice of International Preliminary Report of Patentability dated Jul. 23, 2020 for International Application No. PCT/US2018/013361.

* cited by examiner

ETHERNET LINK EXTENSION METHOD AND DEVICE

BACKGROUND

The Institute of Electrical and Electronics Engineers (IEEE) Standards Associations publishes an IEEE Standard for Ethernet, IEEE Std 802.3-2015, which will be familiar to those of ordinary skill in the art to which this application pertains. This standard provides a common media access control specification for local area network (LAN) operations at selected speeds from 1 Mb/s to 100 Gb/s over coaxial cable, twisted wire pair cable, fiber optic cable, and electrical backplanes. To support shared access on multisegment networks, the standard provides for the use of repeaters at operational speeds up to 1000 Mb/s. Operation at higher speeds appears contemplated solely for point-to-point communication links of an inconveniently limited length. The length limits are imposed by the existence of channel non-idealities such as dispersion and additive noise.

This choice to support only point-to-point links enables the protocol to include auto-negotiation and training phases for optimizing high-speed communications. The auto-negotiation phase enables the end nodes to exchange information about their capabilities, and the training phase enables the end nodes to adapt both transmit-side and receive-side equalization filters in a fashion that combats the channel non-idealities. Both phases are governed by strict timing requirements, and they each fail to account for any intermediate devices or filters.

At least in principle, link extenders, also known as signal reconditioners, retimers, or repeaters, are well known. Ideally such devices operate solely as conduits between the link's end nodes, supporting standard-compliant network operations without appearing as additional nodes in the network. We are not aware of any existing link extension methods or devices that can satisfactorily achieve this ideal for Ethernet links operating at 10 Gb/s or above.

SUMMARY

Accordingly, there are disclosed herein a Ethernet link extension methods and devices. In one illustrative embodiment, an Ethernet link extender includes physical medium attachment (PMA) circuits each having a transmitter and receiver that communicate with a respective node in a sequence of communication phases, the sequence including at least an auto-negotiation phase and a subsequent training phase, the phases occurring simultaneously for both PMA circuits. In the auto-negotiation phase, the PMA circuits operate in a pass-through mode, rendering the extender transparent to the two nodes. In the training phase, the PMA circuits operate independently, sending training frames to their respective nodes based in part on received back-channel information and locally-determined training status information.

An illustrative Ethernet link extension method includes a first communications phase for auto-negotiation and a subsequent communications phase for training for use by a first PMA circuit that communicates with a first node and a second PMA circuit that communicates with a second node. In the first phase, the transmitter of the second PMA circuit is coupled to the receiver of the first PMA circuit to retransmit communications received from the first node, and the transmitter of the first PMA circuit is coupled to the receiver of the second PMA circuit to retransmit communications received from the second node. In the second phase, training controllers in each PMA circuit generate training frames for the respective transmitter to send to the respective node, the frames being based in part on received back-channel information and locally-generated training status information from their respective receivers.

Each of the foregoing embodiments may be implemented individually or in combination, and may be implemented with any one or more of the following features in any suitable combination: (1) the transmitter of the second PMA circuit is coupled to the receiver of the first PMA circuit during the auto-negotiation phase via an on-chip analog signal line. (2) the transmitter of the second PMA circuit is coupled to the receiver of the first PMA circuit during the auto-negotiation phase via a digital signal bus between an analog-to-digital converter and a digital-to-analog converter. (3) the transmitter of the first PMA circuit and the transmitter of the second PMA circuit each include a transmit filter adapted in accordance with back-channel information received from the first and second nodes, respectively, during the training phase. (4) the receiver of the first PMA circuit and the receiver of the second PMA circuit each include a filter adaptation circuit that generates filter coefficient updates and detects filter convergence. (5) at least one of the transmitter of the first PMA circuit and the transmitter of the second PMA circuit includes a training controller providing back-channel information to at least one of the first and second nodes. (6) the training controller confirms filter convergence only when filter converge is detected by both the receiver of the first PMA circuit and the receiver of the second PMA circuit. (7) the receiver of the first PMA circuit and the receiver of the second PMA circuit each include detector. (8) the extender initiates a training phase when either of the detectors detects an end of the auto-negotiation phase. (9) the detectors monitor spectra of received signals for high-frequency content indicative of training frames. (10) the detectors decode information from auto-negotiation frames to detect said end. (11) each of the first PMA circuit and the second PMA circuit include multiple transmitter-receiver pairs to support multiple communication lanes between the first and second nodes. (12) coupling of the transmitter of the second PMA circuit to the receiver of the first PMA circuit during the auto-negotiation phase includes: (a) digitizing communications received from the first node to obtain received signal samples; (b) conveying the received signal samples on a bus to the transmitter of the second PMA circuit; and (c) converting the received signal samples into an analog electrical transmit signal. (13) adapting a transmit filter in each of the transmitter of the first PMA circuit and the transmitter of the second PMA circuit in accordance with back-channel information received from the first and second nodes, respectively, during the training phase. (14) generating filter coefficient updates and detecting filter convergence with a filter adaptation circuit in each of the receiver of the first PMA circuit and the receiver of the second PMA circuit. (15) providing back-channel information to the first and second nodes with a training controller in each of the transmitter of the first PMA circuit and the transmitter of the second PMA circuit. (16) confirming filter convergence with each of the training controllers only when filter converge is detected by both the receiver of the first PMA circuit and the receiver of the second PMA circuit. (17) initiating the training phase when either, but before both, the receiver of the first PMA circuit and the receiver of the second PMA circuit detects an end of the auto-negotiation phase. (18) monitoring spectra of received signals for high-frequency content to detect said end of the auto-negotiation phase. (19) decoding information from auto-negotiation frames to detect said end.

Figure 1:
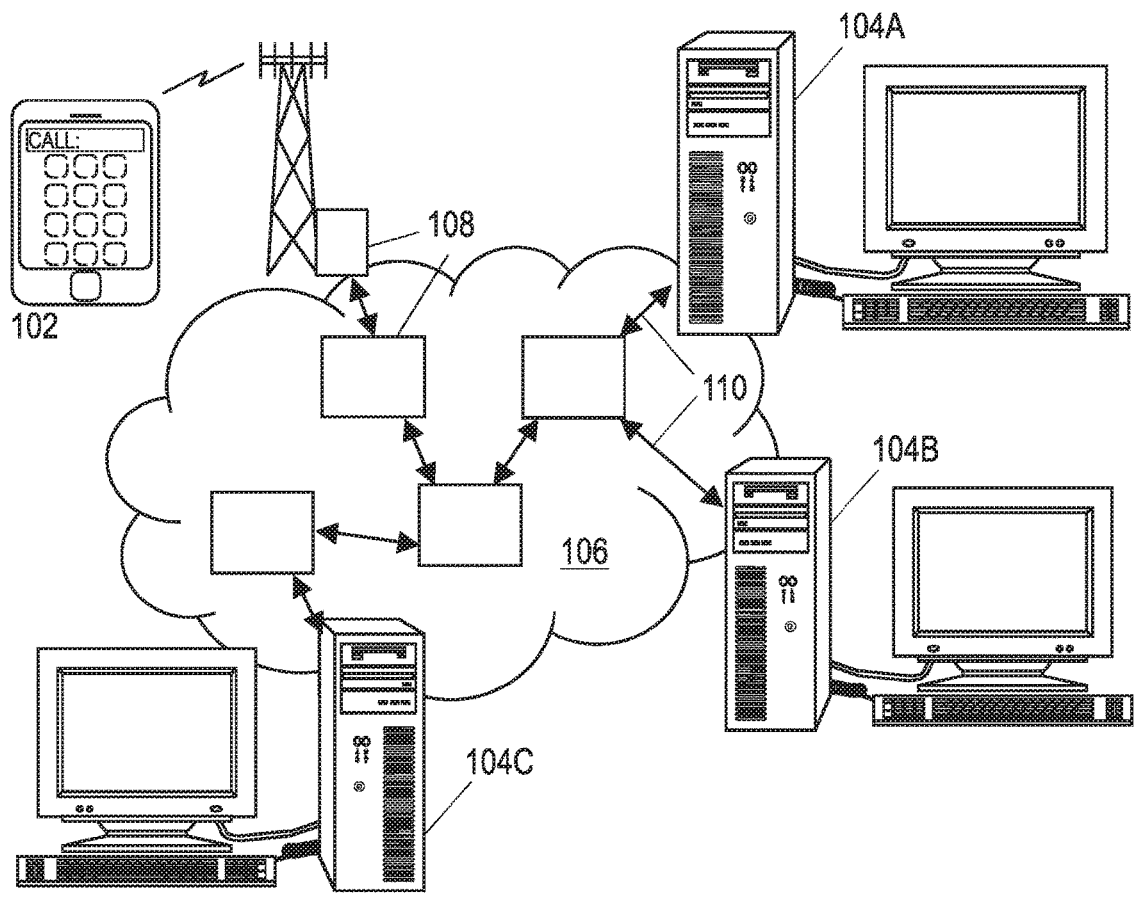
FIG. 1 shows an illustrative communications network.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components. At least some of the links 110 in network 106 are high-speed Ethernet links operating in compliance with the IEEE Std 802.3-2015 at 10 Gb/s or more.

Figure 2:
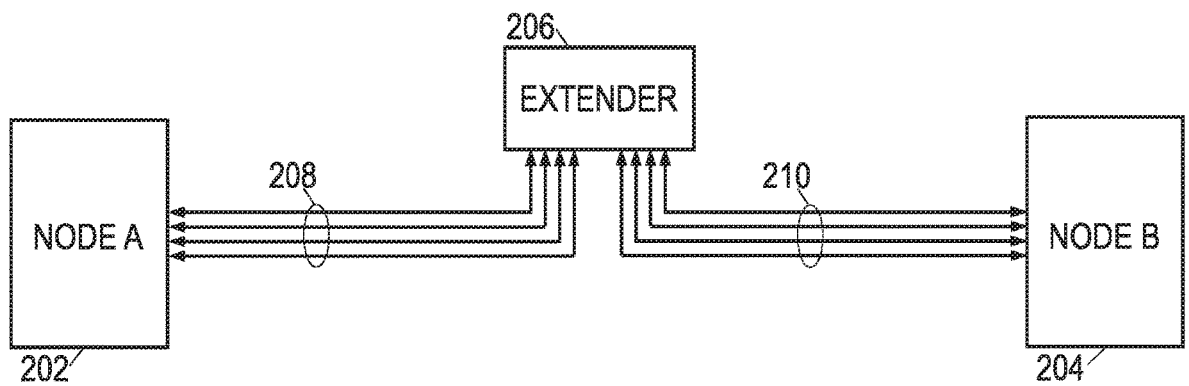
FIG. 2 is a block diagram of an illustrative extended Ethernet link.

FIG. 2 is a block diagram of an illustrative high-speed Ethernet link that may be representative of one or more links 110 in FIG. 1. The illustrated embodiment includes a first node 202 ("Node A") in communication with a second node 204 ("Node B") via an Ethernet link extender 206. Nodes A & B can each be, for example, any one of equipment items 108, computer systems 104A-C, or other sending/receiving devices having high-speed Ethernet ports and separated by a distance greater than the point-to-point link length limitations imposed by the standard. The nodes can also be integrated circuit (IC) chips in a switch or other telecommunications system. The illustrated link includes four bidirectional communication lanes 208 extending from Node A to the extender 206 and four communication lanes 210 extending from Node B to the extender 206. Each bidirectional lane represents two unidirectional lanes operating in opposite directions. In accordance with the standard, these unidirectional or bidirectional lanes may be transported by different twisted wire pairs, electrical back-plane traces, copper transmission lines, or optical fibers, or they may be multiplexed onto shared electrical/optical conductors.

The Ethernet standard specifies the node operations in terms of the hierarchical layers of the Open Systems Interconnection (OSI) model, focusing in particular on the lowermost "physical" layer, which provides the electrical and physical specifications of the connections between the nodes and the communications medium (e.g., pin layouts, line impedances, signal voltages & timing), arrangements of the communications medium (e.g., the network topology), and the electrical and physical specifications for the communications medium itself (e.g., conductor arrangements in copper or fiber optic cable, limitations on attenuation, propagation delay, signal skew). The physical layer is responsible for transmission and reception of raw bit streams over the communications medium, employing simplex, half duplex, or full duplex modes.

Depending on the applicable clauses, the Ethernet standard divides the physical layer into at least three sublayers: the physical medium dependent (PMD) sublayer, the physical medium attachment (PMA) sublayer, and the physical coding sublayer (PCS). The PMD sublayer specifies the transceiver conversions between transmitted/received channel signals and the corresponding bit (or digital symbol) streams. The PMA sublayer operation varies between clauses, but generally specifies (potential) lane remapping, symbol encoding/decoding, framing, and octet/symbol synchronization. In practice, the delineation between PMD and PMA sublayers may be uncertain and the two sublayers more properly regarded as a combined sublayer. The PCS sublayer provides scrambling/descrambling, data encoding/decoding, block and symbol redistribution, alignment marker insertion/removal, and block-level lane synchronization and deskew. An optional forward error correction (FEC) sublayer may reside between the PMA and PCS sublayers to provide, e.g., Reed-Solomon coding/decoding that distributes data blocks with controlled redundancy across the lanes. If present, the FEC sublayer provides at least some of the functionality otherwise allocated to the PCS sublayer, e.g., encoding/decoding, alignment marker insertion/removal, and block-level lane synchronization and deskew.

The circuitry associated with each sublayer (and each of the higher layers in the OSI model) adds to the areal and power requirements of the protocol stack for each device's Ethernet connection, and exacerbates the communications link latency. While this situation is largely unavoidable for the nodes, it is singularly undesirable to impose these penalties on every link extender in the system. The following Ethernet link extender devices and methods seek to exclude any circuitry for implementing the PCS sublayer and any higher layers of the OSI model. At least some of the disclosed extender devices and methods limit their circuitry to only that necessary to implement the PMD and PMA sublayers of the Ethernet standard. As described below, this ideal is achievable by enabling the extender to switch between transparent and opaque modes at different phases of the link establishment process. As a result, the Ethernet link's end nodes (Nodes A & B) conduct standard-compliant operations in ignorance of any intermediate extender devices which may be present, thereby overcoming the link length limitations otherwise imposed by the standard.

Figure 3:
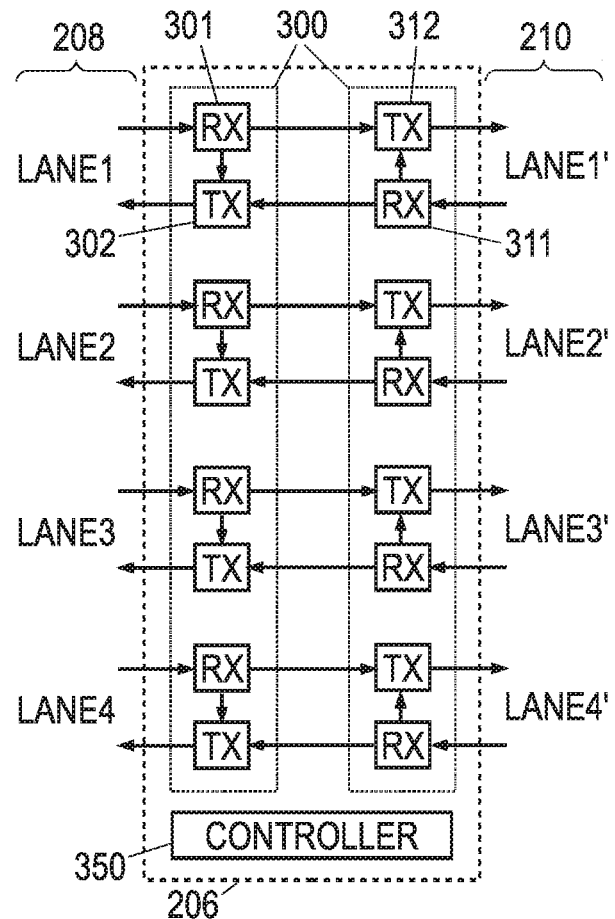
FIG. 3 is a block diagram of an illustrative Ethernet link extender.

FIG. 3 is a high-level block diagram of an illustrative extender 206 having two PMA circuits 300, one for communicating with Node A via communication lanes 208, and one for communicating with Node B via communication lanes 210. The PMA circuits 300 each have a transceiver for each communication lane, yielding four transmitter-receiver pairs within each PMA circuit. For example, receiver 301 and transmitter 302 communicate with Node A via Lane 1, while receiver 311 and transmitter 312 communicate with Node B via Lane 1'. Lanes 2-4 and 2'-4' are similarly supported. An integrated controller 350 provides chip-level support functions (e.g., voltage regulation, clock generation, MDIO/I2C bus interface for programming and testing) and a firmware-programmed microcontroller having registers for coordinating and controlling the operations of the PMA circuits 300.

In the normal operating phase, i.e., after the link has been established and data is being conveyed between the nodes, extender 300 operates as follows. Receiver 301 receives via Lane 1 a channel signal from Node A, converts the channel signal into digital receive signal, or more precisely, a frame- and symbol-synchronized bit stream representing the data conveyed via Lane 1. Receiver 301 provides this digital receive signal to transmitter 312, which converts it into a channel signal transmitted to Node B via Lane 1'. The signal-to-noise ratio of the transmitted channel signal on Lane 1' is thereby enhanced relative to the signal-to-noise ratio of the received channel signal on Lane 1. Receiver 311 and transmitter 302 perform the same operations for communications from Node B to Node A. The remaining transmitters and receivers operate similarly for the remaining communications lanes. Note that it may advantageously simplify implementation if the communication lanes are enabled to operate independently in the described fashion.

To get to the normal operating phase, however, the standard requires that the link pass through an auto-negotiation phase and a subsequent training phase. The auto-negotiation phase enables the end nodes to exchange information about their capabilities, and the training phase enables the end nodes to adapt both transmit-side and receive-side equalization filters in a fashion that combats the channel non-idealities. Both phases are governed by strict timing requirements, and the standard fails to account for the possibility of any intermediate devices or filters.

The standard specifies that the end nodes initiate the setup of each communications lane by transmitting and receiving frames of auto-negotiation information regarding the respective capabilities of both nodes, acknowledgements of received information, and the results of an arbitration process to select an optimal set of communications parameters given the nodes' respective capabilities. To comply with the standard, the extender, being initially ignorant of the respective capabilities of the end nodes, must force multiple rounds of auto-negotiation to assure an optimal set of communications parameters is chosen by the nodes. (The extender would implement PMA and PCS sublayers that enter a first round of auto-negotiation with each end node to determine their respective capabilities, then enter a second round in which the extender masquerades itself to each end node as the other end node. Note that additional rounds would also be required if more than one extender is present. In the meantime, the timing limitations on the training phase may cause a link failure.)

Preferably, then, the extender does not participate in the auto-negotiation process, instead operating in a pass through ("transparent") mode to retransmit the auto-negotiation frames received from each node to the other. In at least some "packet-sniffing" embodiments, the controller 350 monitors the contents of the auto-negotiation frames received on each lane, determining from the embedded control codes for each lane when the selection process is complete and the auto-negotiation phase is concluded. (Rather than treating the communications lanes independently, some alternative embodiments conduct the auto-negotiation process on only the first lane and apply the negotiated communications parameters to all communications lanes. A subsequent failure on any one lane triggers a restart of the auto-negotiation process for all lanes.)

Notably, however, the auto-negotiation frames are formed from low-rate channel symbols having a large separation (in signal space) even after accounting for channel attenuation and the use of untrained equalization filters. These frames accordingly are not subject to the same link length limitation and can be accurately decoded a significantly greater distances. Accordingly, other "non-decoding" embodiments of extender 206 merely pass along the channel signal waveforms conveying the auto-negotiation frames without timing recovery, demodulation, and/or decoding. Amplification and filtering may be provided, or in some cases, analog-to-digital conversion followed by digital-to-analog conversion at a resolution suitable to pass along the waveform with adequate fidelity. Such embodiments may monitor the spectral content and/or other characteristics of the received channel signals to detect when the auto-negotiation phase is concluded. (For example, the training frames will have high-frequency spectral content that is absent from the auto-negotiation frames.)

The packet-sniffing embodiments can determine the negotiated operating parameters from the embedded control codes, while the non-decoding extender embodiments can determine the negotiated operating parameters from the spectral characteristics of the training frames. If the negotiated operating parameters are within the extender's capabilities, the extender configures the receivers and transmitters accordingly and commences the training phase. For 10 GBASE-KR, the training phase details can be found in IEEE Std 802.3 clause 72. For 100 GBASE-KP4, the details are in IEEE 802.3 clause 94. If the auto-negotiation phase is successful, the end nodes remain unaware of any intervening link extenders during the auto-negotiation phase. However, if the end nodes negotiate a speed that cannot be supported, at least some link extender embodiments treat this situation as an error condition and temporarily disable the transmitters, thereby aborting the link setup process.

The auto-negotiation phase is followed by a subsequent training phase, in which each end node transmits and receives frames of training information. The frames include broadband training sequences that the other node can employ to adapt its receive filters, training status information, and back-channel information used by the receiving node to adjust its transmit filters. The standard link length limitations apply to the training sequences, and in any event, the extender's transmit and receive filters should also be trained. Accordingly, the extender participates in the training phase, masquerading itself as an end node on each communication lane. Thus, for example, receiver 301 and transmitter 302 participate in the training phase with Node A, while at the same time receiver 311 and transmitter 312 participate in the training phase with Node B. Other than the simultaneous nature of the training phases, the Node A and Node B training occur independently of each other. If the training occurs more quickly on the Node A link than on the Node B link (or vice versa), the extender may prolong the training process on the sufficiently trained link until the training for both links is completed, so that the Node A and Node B training phases conclude at substantially the same time.

As previously noted, some extender embodiments coordinate the operations of all lanes, so that the training phase for all lanes begins and ends at the same time. Other embodiments enable the lanes to operate independently, and for each lane provide coordination of the Node A and Node B links. As the training phase for each lane (or for all lanes)

concludes, the extender places the lanes in a normal-operations mode, which may alternatively be referred to as the frame-forwarding phase. In the frame-forwarding phase, the extender recovers the symbols or bits from each frame received on a given lane from an end node and retransmits them as a regenerated frame on the corresponding lane to the other end node. The extender can thus convey data between the end nodes with very small latency and low power overhead.

Figure 4:
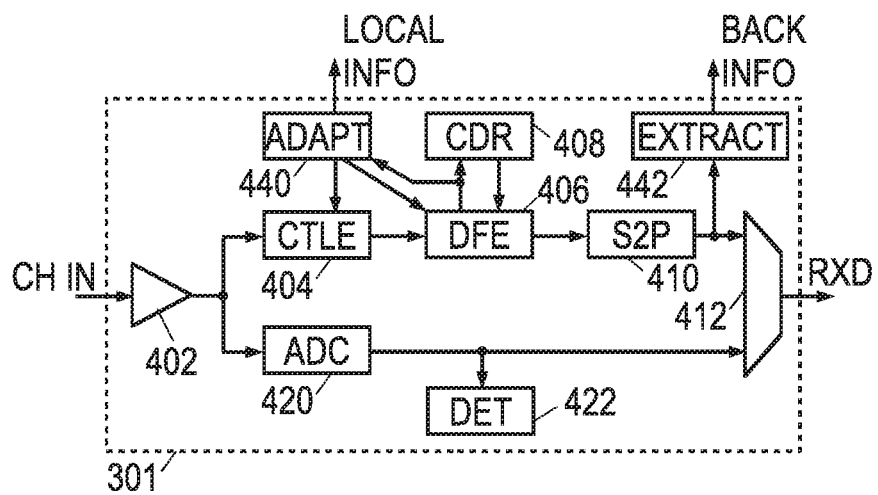
FIG. 4 is a block diagram of an illustrative PMA circuit receiver.

FIG. 4 shows an illustrative receiver 301 suitable for use in the PMA circuits 300. The channel input (CH_IN) node receives an analog electrical signal from a transducer (e.g., a photodiode) or directly from the channel lane conductor and supplies it to a low noise amplifier (LNA) 402. The LNA 402 provides a high input impedance to minimize channel loading and amplifies the received electrical signal to drive the input of a continuous time linear equalizer (CTLE) filter 404. During normal operations, CTLE 404 provides continuous time filtering to shape the signal spectrum in an adaptive fashion to reduce the length of the channel impulse response while minimizing leading inter-symbol interference (ISI). A decision feedback equalizer (DFE) 406 operates on the filtered signal to correct for trailing ISI and detect each transmitted channel bit or symbol, thereby producing a demodulated digital data stream. Some embodiments employ oversampling. A clock and data recovery (CDR) circuit 408 extracts a clock signal from the filtered signal and/or the digital data stream and supplies it to DFE 406 to control timing of the symbol detection. A serial-to-parallel circuit 410 groups the digital data stream bits or symbols into blocks to enable the use of lower clock rates for subsequent on-chip operations. During normal operations, multiplexer 412 places the blocks on the digital receive bus (RXD) for retransmission to the remote end node by a transmitter (e.g., transmitter 312).

During the auto-negotiation phase, the illustrated LNA 402 supplies the amplified receive signal to an analog-to-digital converter (ADC) 420. ADC 420 digitizes the receive signal, optionally with a sampling rate and resolution to provide adequate reconstruction without requiring timing recovery. The multiplexer 412 places the digital samples of the receive signal on the RXD bus for retransmission on another link. A detector 422 monitors the receive signal for the end of the auto-negotiation phase and/or the beginning of the training phase frames. Alternatively, the auto-negotiation phase signals may be passed through the normal operations signal path (402-404-406-410) with untrained (default) filters and a packet information extractor 442 employed to monitor the contents of the auto-negotiation frames for detecting the end of the auto-negotiation phase.

During the training phase, LNA 402 supplies the received signal to CTLE filter 404, DFE 406, and S2P circuit 410. A filter adaptation circuit 440 measures an error between the input and output of a decision element in DFE 406, employing that error in accordance with well-known techniques from the literature on adaptive filtering to determine adjustments for the coefficients in CTLE filter 404, DFE 406, and a transmit filter 506 (discussed further below), and to determine whether convergence has been achieved. The locally-generated information (LOCAL_INFO) including the transmit filter coefficient adjustments and the convergence status are provided to the local transmitter (e.g., transmitter 302). As discussed below, the local transmitter communicates the transmit filter adjustments and the convergence status via a back-channel to the local end node. In that vein, the received signal includes back-channel information from the local end node. A packet information extractor 442 detects the back-channel information (BACK_INFO) and passes it to the local transmitter (e.g., transmitter 302). Once convergence is achieved, receiver 301 is ready to begin normal operations.

Figure 5:
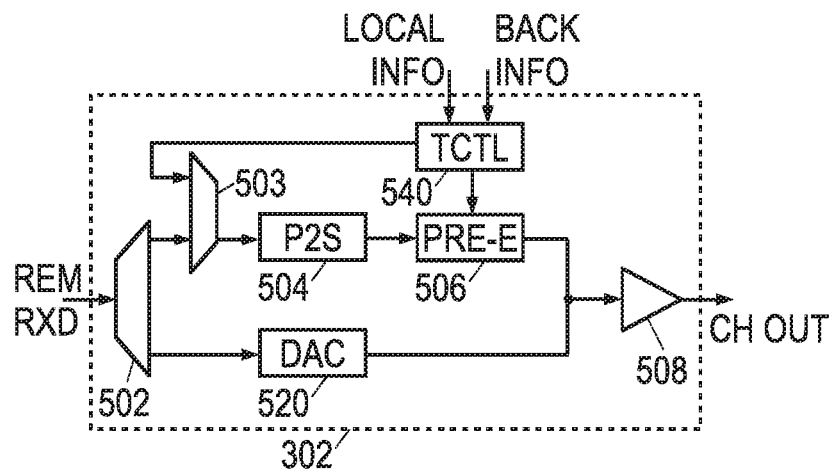
FIG. 5 is a block diagram of an illustrative PMA circuit transmitter.

FIG. 5 shows an illustrative transmitter 302 suitable for use in the PMA circuits 300. During normal operations, demultiplexer 502 and multiplexer 503 supply blocks of channel bits or symbols from the remote end node conveyed by the RXD bus to the parallel to serial (P2S) circuit 504. P2S circuit converts the blocks into a digital data stream. A transmit filter 506, also called a pre-emphasis filter, converts the digital data stream into an analog electrical signal with spectral shaping to combat channel degradation. Driver 508 amplifies the analog electrical signal to drive the channel output (CH_OUT) node.

During the auto-negotiation phase, illustrated demultiplexer 502 directs digital samples of the received auto-negotiation signals received from the remote end node and conveyed via the RXD bus to a digital-to-analog converter (DAC) 520. DAC 520 converts the digital samples into an analog electrical signal that reproduces the received auto-negotiation signals. Driver 508 amplifies the analog electrical signal to drive the channel output (CH_OUT) node. If the ADC path is omitted from receiver (FIG. 4), the DAC path may also be omitted from the transmitter. The normal operations path may be employed with an untrained (default) transmit filter. As another alternative, a switchable on-chip analog signal line may couple LNA 402 for a local end node to the driver 508 for a remote end node.

During the training phase, multiplexer 503 obstructs information from the RXD bus, instead supplying P2S circuit 504 with training frames from a training controller 540. The training controller 540 generates the training frames based on the convergence status and transmit filter coefficient adjustments (LOCAL_INFO) received from the local receiver (e.g., receiver 301). Note that even after the local receiver indicates filter convergence has occurred, the training controller 540 may prolong the training phase to coordinate training phase timing with the receiver for the remote end node (e.g., receiver 311). The training frames further include training sequences as specified by the relevant portions of the IEEE Std 802.3.

The training controller 540 further accepts the back-channel information (BACK_INFO) extracted by the local receiver from received training frames sent by the local end node. The training controller applies the corresponding adjustments to the coefficients of transmit filter 506. Upon conclusion of the training phase, multiplexer 503 begins forwarding RXD blocks to the P2S circuit 504.

Figure 6:
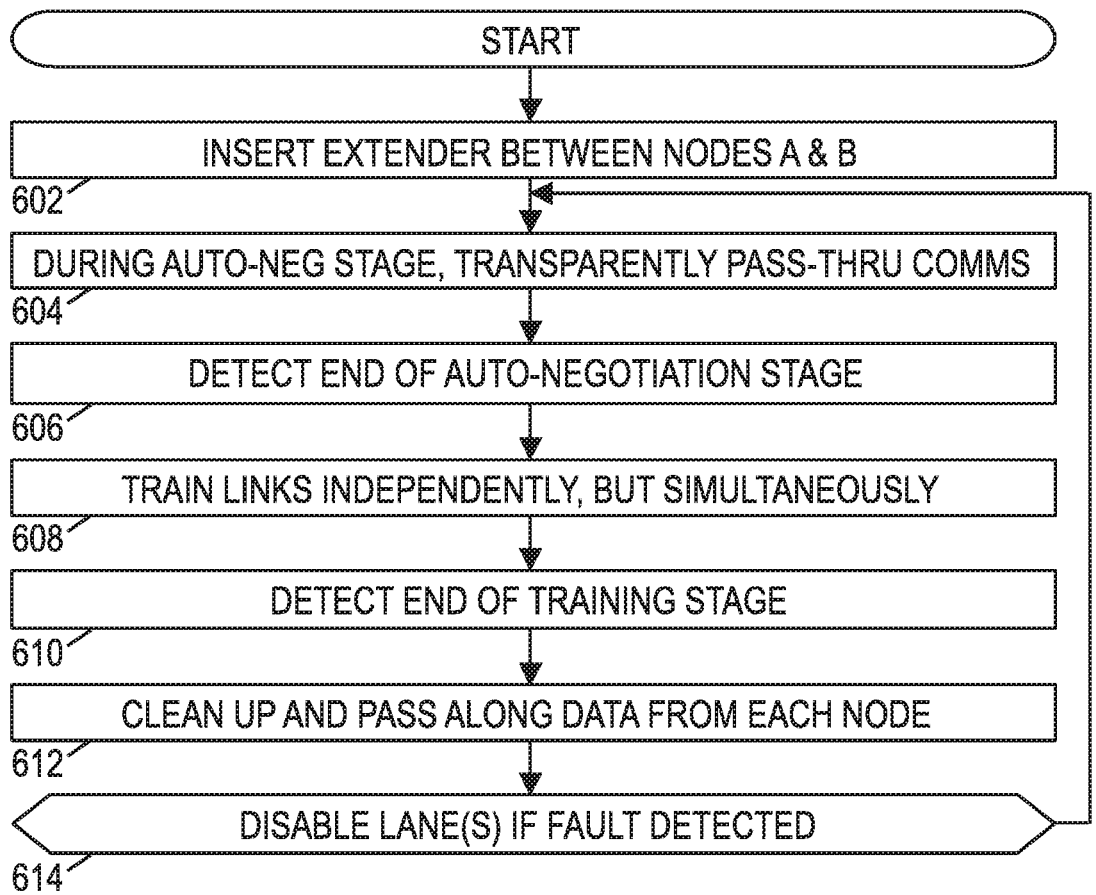
FIG. 6 is a flowchart of an illustrative Ethernet link extension method.

FIG. 6 is a flowchart of an illustrative Ethernet link extension method. It begins in block 602 with a technician or user connecting end nodes of an Ethernet link via an intermediate link extender. When each end node powers up, or periodically thereafter, it initiates an auto-negotiation phase to set up the link. In block 604, the extender conceals itself during the auto-negotiation phase, transparently passing the signals received from each end node to the other end node. The signals may be passed through the extender as analog signals; as analog-to-digital and digital-to-analog converted waveforms, or as demodulated and remodulated data frames. In other words, a transmitter of a second PMA (physical medium attachment) circuit is coupled to a receiver of a first PMA circuit to retransmit communications received from a first node; and a transmitter of the first PMA circuit is coupled to a receiver of the second PMA circuit to retransmit communications received from the second node.

During the auto-negotiation phase, the extender monitors the received signals until, in block 606, the end of the auto-negotiation phase is detected. As discussed previously, the extender may perform this detection by decoding information from the auto-negotiation frames exchanged between the end nodes and/or by monitoring the spectra for high-frequency content typical of training sequences. Having detected the end of the auto-negotiation phase from either end node on a given lane, the extender initiates the training phase on that lane for both end nodes simultaneously in block 608. Training controllers for each of the first and second PMA circuits generate training frames for transmission by the transmitter of the respective PMA circuit based in part on back-channel information and training status information from the local receiver of the respective PMA circuit.

The training phase is performed concurrently for both end nodes, prolonged if necessary until the links are trained for both end nodes in block 610, indicating that the training phase can be concluded for both. The extender then signals the end of the training phase on that lane to both end nodes and enters the frame-forwarding phase in block 612.

In the frame-forwarding phase of block 612, the extender demodulates the channel data frames to extract the channel bits or symbols from each end node. The channel bits or symbols are then remodulated for transmission to the other end node, obviating any need for a PCS sublayer and thereby minimizing latency and power consumption with minimal impairment to link robustness. In some extender embodiments, the extender monitors the equalization error levels, or performs checksum calculations to detect errors. If a fault is detected, in block 614 the extender temporarily disables the transmitters for that lane to force re-initiation of the link, and the method then repeats beginning with block 604.

Numerous alternative forms, equivalents, and modifications will become apparent to those skilled in the art once the above disclosure is fully appreciated. For example, the foregoing description focuses on implementations employing only one link extender between end nodes, but the disclosed principles would still apply if multiple extenders are provided in sequence between the end nodes. It is intended that the claims be interpreted to embrace all such alternative forms, equivalents, and modifications that are encompassed in the scope of the appended claims.

What is claimed is:

1. An Ethernet link extender that comprises:
    a first PMA (physical medium attachment) circuit having a transmitter and a receiver that communicate in a sequence of phases with a first node, the sequence including at least an auto-negotiation phase and a subsequent training phase; and
    a second PMA circuit having a transmitter and a receiver that communicate in said sequence of phases with a second, different node, the phases in said sequence being simultaneous for the first and second PMA circuits,
    the transmitter of the second PMA circuit being coupled to the receiver of the first PMA circuit during the auto-negotiation phase to retransmit communications received from the first node,
    the transmitter of the first PMA circuit being coupled to the receiver of the second PMA circuit during the auto-negotiation phase to retransmit communications received from the second node,
    the transmitter of the first PMA circuit and the transmitter of the second PMA circuit each including a transmit filter adapted in accordance with back-channel information received from the first and second nodes, respectively, during the training phase, and
    the first and second PMA circuits each including a respective training controller that, during the training phase, generates training frames for transmission by the transmitter of the respective PMA circuit based in part on back-channel information and training status information from the receiver of the respective PMA circuit.

2. The extender of claim 1, wherein said coupling of the transmitter of the second PMA circuit to the receiver of the first PMA circuit during the auto-negotiation phase is via an on-chip analog signal line.

3. The extender of claim 1, wherein said coupling of the transmitter of the second PMA circuit to the receiver of the first PMA circuit during the auto-negotiation phase is via a digital signal bus between an analog-to-digital converter and a digital-to-analog converter.

4. The extender of claim 1, wherein the receiver of the first PMA circuit and the receiver of the second PMA circuit each include a filter adaptation circuit that generates filter coefficient updates and detects filter convergence.

5. The extender of claim 1, wherein each of the first PMA circuit and the second PMA circuit include multiple transmitter-receiver pairs to support multiple communication lanes between the first and second nodes.

6. An Ethernet link extender that comprises:
    a first PMA (physical medium attachment) circuit having a transmitter and a receiver that communicate in a sequence of phases with a first node, the sequence including at least an auto-negotiation phase and a subsequent training phase; and
    a second PMA circuit having a transmitter and a receiver that communicate in said sequence of phases with a second, different node, the phases in said sequence being simultaneous for the first and second PMA circuits,
    the transmitter of the second PMA circuit being coupled to the receiver of the first PMA circuit during the auto-negotiation phase to retransmit communications received from the first node,
    the transmitter of the first PMA circuit being coupled to the receiver of the second PMA circuit during the auto-negotiation phase to retransmit communications received from the second node,
    the receiver of the first PMA circuit and the receiver of the second PMA circuit each including a filter adaptation circuit that generates filter coefficient updates and detects filter convergence,
    the first and second PMA circuits each including a respective training controller that, during the training phase, generates training frames for transmission by the transmitter of the respective PMA circuit providing back-channel information and training status information from the receiver of the respective PMA circuit to a respective one of the first and second nodes, and
    the training controllers each confirming filter convergence only when filter convergence is detected by both the receiver of the first PMA circuit and the receiver of the second PMA circuit.

7. The extender of claim 1, wherein the receiver of the first PMA circuit and the receiver of the second PMA circuit each include detector, and wherein the extender initiates a training phase when either of the detectors detects an end of the auto-negotiation phase.

8. The extender of claim 7, wherein the detectors decode information from auto-negotiation frames to detect said end.

9. An Ethernet link extender that comprises:
a first PMA (physical medium attachment) circuit having a transmitter and a receiver that communicate in a sequence of phases with a first node, the sequence including at least an auto-negotiation phase and a subsequent training phase; and
a second PMA circuit having a transmitter and a receiver that communicate in said sequence of phases with a second, different node, the phases in said sequence being simultaneous for the first and second PMA circuits,
the transmitter of the second PMA circuit being coupled to the receiver of the first PMA circuit during the auto-negotiation phase to retransmit communications received from the first node,
the transmitter of the first PMA circuit being coupled to the receiver of the second PMA circuit during the auto-negotiation phase to retransmit communications received from the second node,
the first and second PMA circuits each including a respective training controller that, during the training phase, generates training frames for transmission by the transmitter of the respective PMA circuit based in part on back-channel information and training status information from the receiver of the respective PMA circuit, and
the receiver of the first PMA circuit and the receiver of the second PMA circuit each including a detector that monitors spectra of received signals for high-frequency content indicative of training frames to detect an end of the auto-negotiation phase, the extender initiating a training phase when either of the detectors detects the end of the auto-negotiation phase.

10. An Ethernet link extension method that comprises, in a first communications phase for auto-negotiation:
coupling a transmitter of a second PMA (physical medium attachment) circuit to a receiver of a first PMA circuit to retransmit communications received from a first node; and
coupling a transmitter of the first PMA circuit to a receiver of the second PMA circuit to retransmit communications received from a second node; and
in a subsequent communications phase for training:
generating, with a respective training controller for each of the first and second PMA circuits, training frames for transmission by the transmitter of the respective PMA circuit based in part on back-channel information and training status information from the receiver of the respective PMA circuit; and
adapting a transmit filter in each of the transmitter of the first PMA circuit and the transmitter of the second PMA circuit in accordance with back-channel information received from the first and second nodes, respectively, during the training phase.

11. The method of claim 10, wherein said coupling of the transmitter of the second PMA circuit to the receiver of the first PMA circuit during the auto-negotiation phase is via an on-chip analog signal line.

12. The method of claim 10, wherein said coupling of the transmitter of the second PMA circuit to the receiver of the first PMA circuit during the auto-negotiation phase includes:
digitizing communications received from the first node to obtain received signal samples;
conveying the received signal samples on a bus to the transmitter of the second PMA circuit; and
converting the received signal samples into an analog electrical transmit signal.

13. The method of claim 10, further comprising generating filter coefficient updates and detecting filter convergence with a filter adaptation circuit in each of the receiver of the first PMA circuit and the receiver of the second PMA circuit.

14. The method of claim 10, wherein each of the first PMA circuit and the second PMA circuit include multiple transmitter-receiver pairs to support multiple communication lanes between the first and second nodes.

15. An Ethernet link extension method that comprises, in a first communications phase for auto-negotiation:
coupling a transmitter of a second PMA (physical medium attachment) circuit to a receiver of a first PMA circuit to retransmit communications received from a first node; and
coupling a transmitter of the first PMA circuit to a receiver of the second PMA circuit to retransmit communications received from a second node; and
in a subsequent communications phase for training:
generating filter coefficient updates and detecting filter convergence with a filter adaptation circuit in each of the receiver of the first PMA circuit and the receiver of the second PMA circuit;
generating, with a respective training controller for each of the first and second PMA circuits, training frames for transmission by the transmitter of the respective PMA circuit providing back-channel information and training status information from the receiver of the respective PMA circuit to the first and second nodes; and
confirming filter convergence only when filter convergence is detected by both the receiver of the first PMA circuit and the receiver of the second PMA circuit.

16. The method of claim 10, initiating the training phase when either, but before both, the receiver of the first PMA circuit and the receiver of the second PMA circuit detects an end of the auto-negotiation phase.

17. The method of claim 16, further comprising decoding information from auto-negotiation frames to detect said end.

18. An Ethernet link extension method that comprises, in a first communications phase for auto-negotiation:
coupling a transmitter of a second PMA (physical medium attachment) circuit to a receiver of a first PMA circuit to retransmit communications received from a first node;
coupling a transmitter of the first PMA circuit to a receiver of the second PMA circuit to retransmit communications received from a second node; and
monitoring spectra of received signals for high-frequency content to detect an end of the auto-negotiation phase; and
in a subsequent communications phase for training, the communications phase for training being initiated when either the receiver of the first PMA circuit and the receiver of the second PMA circuit detects the end of the auto-negotiation phase:
generating, with a respective training controller for each of the first and second PMA circuits, training frames for transmission by the transmitter of the respective PMA circuit based in part on back-channel information and training status information from the receiver of the respective PMA circuit.

* * * * *